March 2, 1954      G. W. KAMINSKI      2,670,545
DEVICE FOR POSITIONING WORKPIECES FOR DRILLING
Filed Oct. 9, 1950      3 Sheets-Sheet 1
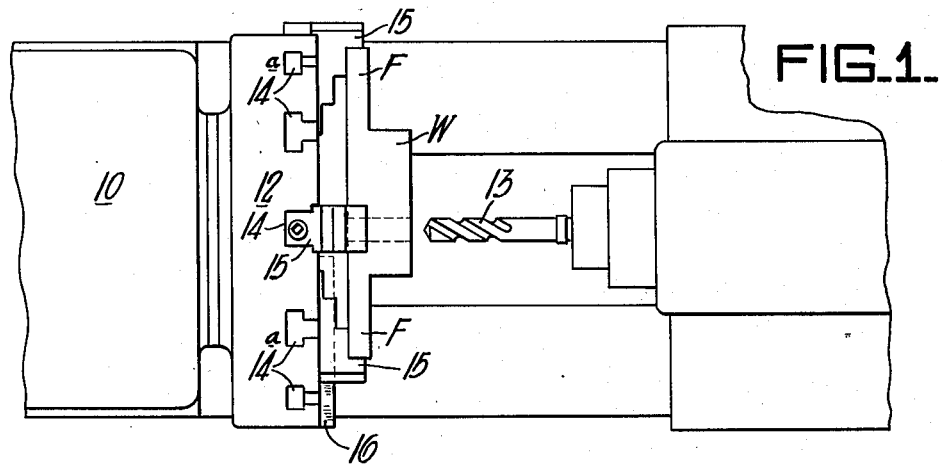
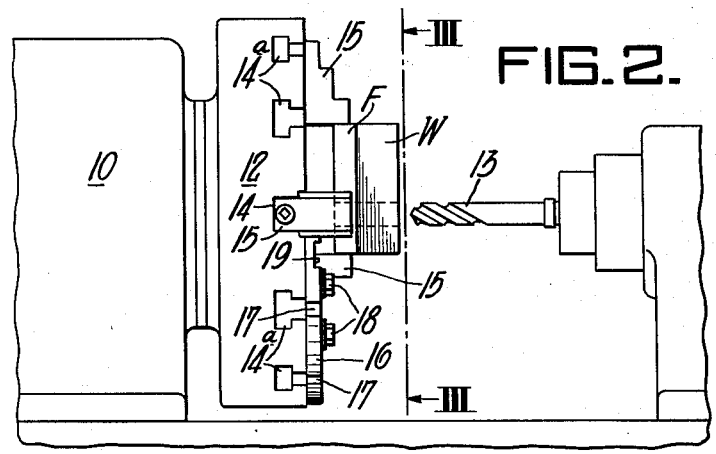
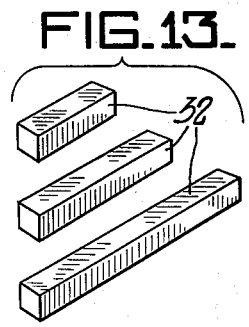
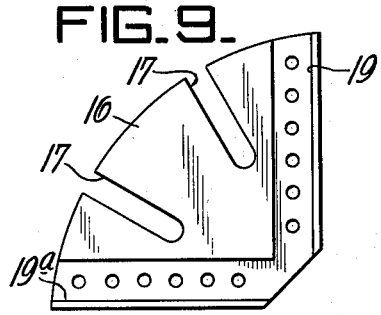
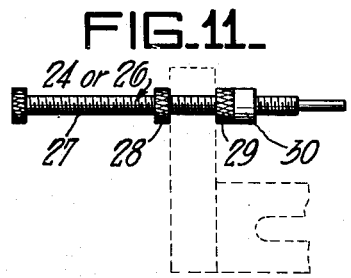
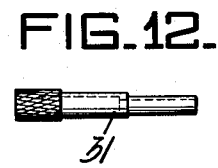
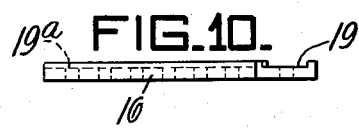
Inventor:
GEORGE W. KAMINSKI,
by: Donald G. Dalton
his Attorney.

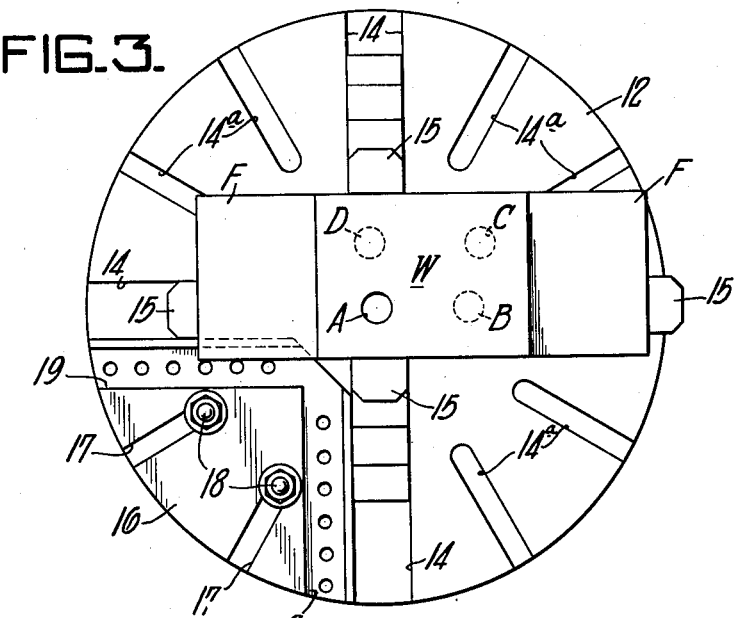
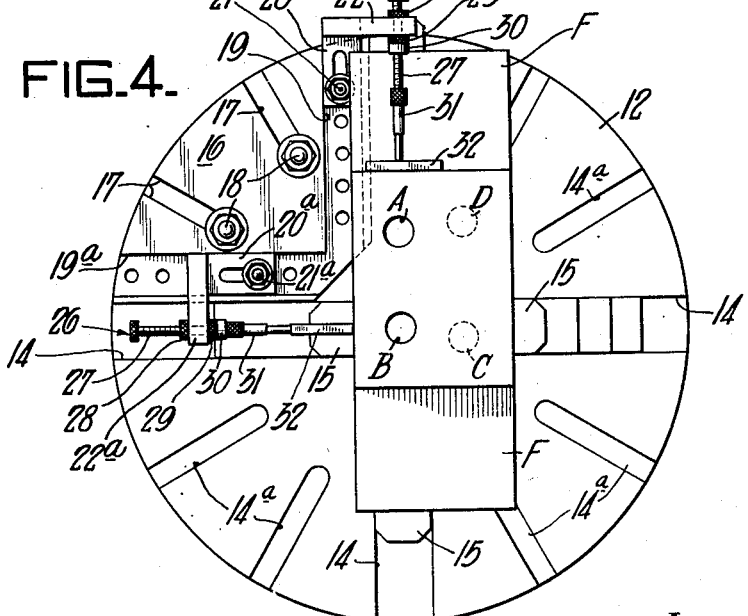

March 2, 1954 — G. W. KAMINSKI — 2,670,545
DEVICE FOR POSITIONING WORKPIECES FOR DRILLING
Filed Oct. 9, 1950 — 3 Sheets-Sheet 3
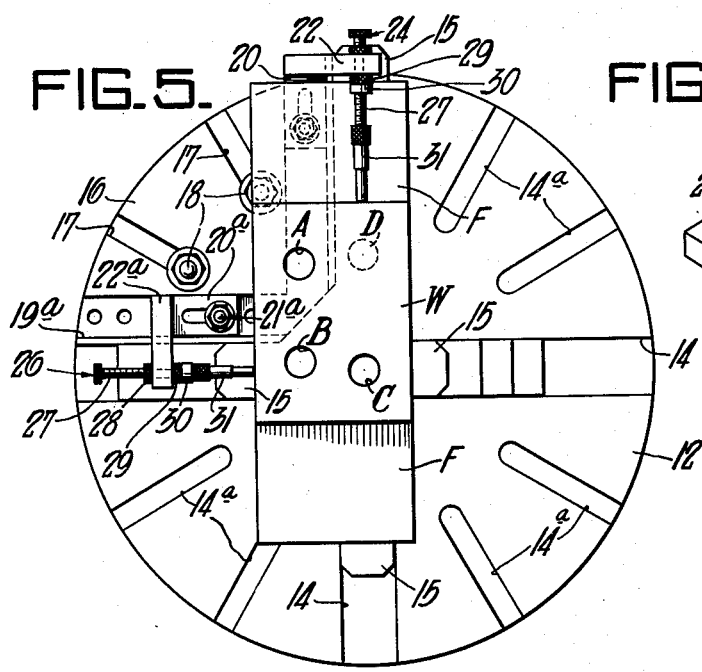
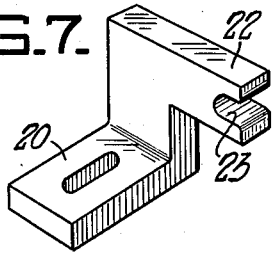
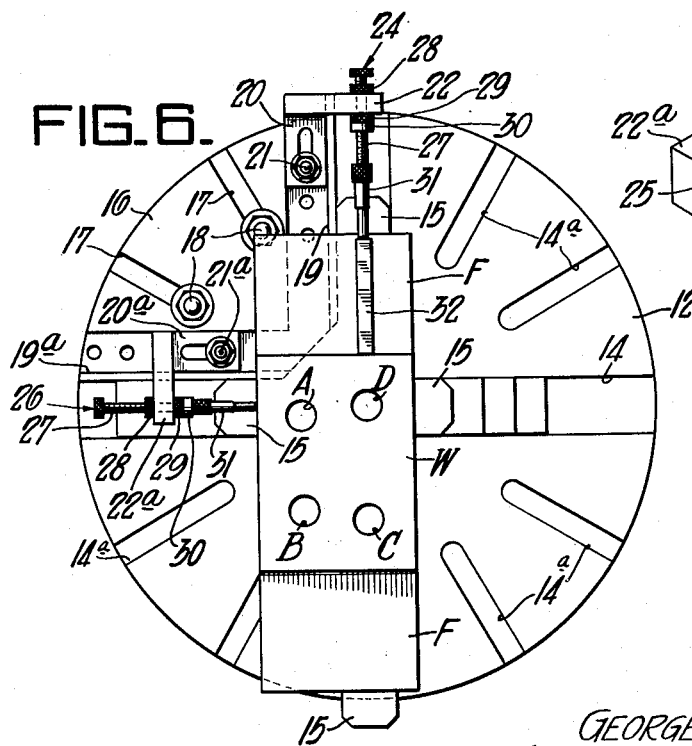
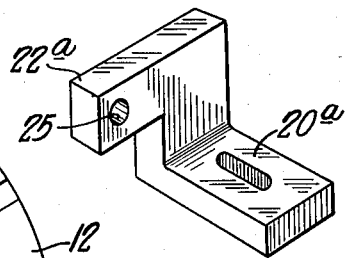
Inventor:
GEORGE W. KAMINSKI,
by: Donald G. Dalton
his Attorney.

Patented Mar. 2, 1954

2,670,545

UNITED STATES PATENT OFFICE 2,670,545

DEVICE FOR POSITIONING WORKPIECES
FOR DRILLING

George W. Kaminski, Gary, Ind.

Application October 9, 1950, Serial No. 189,226

3 Claims. (Cl. 33—185)

This invention relates to improved devices for positioning workpieces for drilling.

An object of the invention is to provide improved positioning devices which simplify locating a workpiece on a chuck plate at the different positions it must occupy for drilling a number of openings according to a predetermined pattern.

A further object of the invention is to provide improved positioning devices which, after a workpiece has been positioned on a chuck by conventional methods for drilling one opening, automatically locate from this first position the positions the workpiece must occupy for drilling other openings in a predetermined pattern, and which automatically locate all the positions additional workpieces must occupy for drilling them according to the same pattern.

A further object of the invention is to provide improved apparatus for positioning workpieces on chuck plates for drilling openings therein accurately according to predetermined patterns.

In accomplishing these and other objects of the invention, I have provided improved details of structure, a preferred form of which is shown in the accompanying drawings, in which:

Figure 1 is a top plan view of a portion of a drilling machine equipped with a positioning device which embodies features of the present invention;

Figure 2 is a side elevational view of the machine shown in Figure 1;

Figure 3 is an end elevational view of the chuck plate of the drilling machine and the base plate of the positioning device prior to installation of the brackets and gauges and with a workpiece positioned for drilling the first opening of a pattern of four, the view being taken substantially on line III—III of Figure 2;

Figures 4, 5 and 6 are views similar to Figure 3, but showing the brackets and gauges installed and the workpiece positioned for drilling the second, third and fourth openings respectively of this pattern;

Figures 7 and 8 are perspective views of the two adjustable brackets which the device comprises;

Figures 9 and 10 are plan and elevational views of the base plate which the device comprises;

Figure 11 is an elevational view of one of the two gauge shanks which the device comprises;

Figure 12 is an elevational view of one of the two gauge thimbles which the device comprises; and Figure 13 is a perspective view of several of the spacer blocks which are used with the device.

The drawings show a drilling machine 10, which can be of any usual or desirable construction, such as a lathe. The machine includes a chuck plate 12 and a drilling or boring tool 13. The face of the chuck plate has four radially arranged T-slots 14, which are spaced 90° from each other and carry chuck jaws 15. These jaws grip a rectangular workpiece W and thereby clamp it to the chuck plate so that tool 13 can drill openings therein. The face of the chuck plate also has intermediate slots 14a between slots 14. Chuck plate 12 and tool 13 have a fixed common axis and chuck jaws 15 are adjusted to different positions in their slots 14 to move the workpiece to different positions for drilling openings in different locations therein. Inasmuch as machines of such construction and operation are well known, no more detailed description is deemed necessary.

In the example illustrated the workpiece is a die-block, such as is used for punching railroad tie plates. This workpiece receives four openings A, B, C and D in the pattern shown in Figures 3 to 6. The workpiece also has flanges F at each end. However, this particular workpiece is only illustrative of the sort for which the positioning device is suited, and is in no sense limiting.

The positioning device comprises a quadrant shaped base plate 16 (Figures 9 and 10) which fits against the face of chuck plate 12 between two of its slots 14. Plate 16 has radial slots 17 coinciding with the two intermediate slots 14a which the quadrant plate overlies. Bolts and nuts 18 (Figures 3 to 6) pass through these slots 14a and 17 and thus fix the quadrant plate to the chuck plate.

The exposed face of the quadrant plate contains grooves 19 and 19a which are at right angles to each other and parallel to its radial edges. Gauge brackets 20 and 20a (Figures 7 and 8) are slidably carried in these grooves. Bolts 21 and 21a retain said brackets in adjusted position in grooves 19 and 19a. The brackets have arms 22 and 22a respectively which overlie the adjacent slots 14 in the chuck plate. Arm 22 on bracket 20 has a slot 23 in its extremity and carries therein an adjustable longitudinal gauge 24. Arm 22a has an aperture 25 in its extremity and carries therein an adjustable transverse gauge 26. The two gauges are similarly constructed so that a description of one serves for both.

Each gauge includes an elongated screw threaded shank 27, which carries outer and inner setting nuts 28 and 29 respectively and an inner lock nut 30 (Figure 11). When the positioning device is set up, as hereinafter explained, the outer setting nuts bear against the outer faces of arms 22 and 22a, the inner setting nuts bear against the inner faces of these arms, and the locks nuts lock the inner setting nuts in their adjusted positions. The free inner ends of the shanks carry thimbles 31 (Figure 12). The longitudinal gauge 24 can be removed readily from its supporting arm 22 through slot 23 when its outer setting nut 28 is loosened. When this gauge is thus removed, its inner setting nut 29 and lock nut 30 remain in their position of adjustment, so that when the gauge is replaced, it is in the same position as before it was removed.

A plurality of spacer blocks 32 (Figure 13) are furnished with the device and their lengths and, in the illustrative example, the thickness of at least one of them, correspond with the longitudinal and transverse spacing of the centers of openings A, B, C and D to be drilled in workpiece W. These spacer blocks are adapted to be inserted between the ends of thimbles 31 and the ends and sides of the workpiece, first for determining the settings of the two gauges and subsequently for determining the positions the workpiece should occupy for drilling the various openings therein, as hereinafter explained.

The method of positioning workpieces utilizing the device just described is as follows:

The location at which the first opening A is to be drilled in the workpiece W is determined by measurement and the workpiece is placed against the chuck plate 12. Jaws 15 are adjusted to clamp the workpiece to the chuck plate with the center about which said opening is to be drilled corresponding with the common axis of the chuck plate and drill tool 13 (Figure 3). The machine is operated to drill the first opening A.

Next the brackets 20 and 20a and the longitudinal and transverse gauges 24 and 26 of the positioning device are set up for drilling the pattern of openings shown, a step which the drawings do not illustrate. For setting up bracket 20 and longitudinal gauge 24, a spacer block 32, whose length corresponds with the longitudinal component of the distance between the centers of openings A and C, is interposed between the end of thimble 31 of the longitudinal gauge and the end face of the workpiece. The bracket and gauge are adjusted so that the end of the thimble is spaced from the end face of the workpiece this exact length. The nut on bolt 21 and the setting nuts 28 and 29 and lock nut 30 then are tightened. For setting up bracket 20a and transverse gauge 26, the procedure is similar except that the length of the spacer block 32, which is interposed between the end of the thimble and the side face of the workpiece, corresponds with the transverse component of the distance between the centers of the openings A and C. After the two brackets and gauges are set up, the spacer blocks are removed.

With the positioning device thus set up, chuck jaws 15 are loosened and the workpiece is shifted longitudinally to a position where the center about which opening B is to be drilled coincides with the common axis of the chuck plate and drill tool (Figure 4). This position is determined by interposing appropriate spacer blocks 32 between the gauge thimbles and the end and side faces of the workpiece. The spacer block 32 between the thimble of transverse gauge 26 and the side face of the workpiece is the same as before, since the two openings A and B have the same transverse distance from opening C. A spacer block 32, whose thickness corresponds with the longitudinal distance between the centers of openings B and C, is interposed between the thimble of longitudinal gauge 24 and the end face of the workpiece. With the workpiece thus positioned, chuck jaws 15 are tightened, and the machine is operated to drill the opening B.

Next chuck jaws 15 again are loosened and the workpiece is shifted both longitudinally and transversely to a position for drilling opening C (Figure 5). In this position the end face of the workpiece contacts the thimble on longitudinal gauge 24, and the side face of the workpiece contacts the thimble on transverse gauge 26. With the workpiece thus positioned, jaws 15 are tightened and the machine is operated to drill the opening C.

Chuck jaws 15 again are loosened and last the workpiece is shifted longitudinally to a position for drilling opening D (Figure 6). The side face of the workpiece remains in contact with the thimble on the transverse gauge, since the centers of openings D and C are the same distance from the side face of the workpiece. An appropriate spacer block 32, whose length corresponds with the longitudinal distance between the centers of openings C and D, is interposed between the thimble on the longitudinal gauge and the end face of the workpiece. With the workpiece thus positioned, jaws 15 are tightened and the machine is operated to drill the opening D.

Next chuck jaws 15 are loosened and the workpiece with its pattern of openings complete is removed. The longitudinal gauge 24 can be removed to facilitate removal of the workpiece, since this gauge overlies one of the flanges F of the workpiece. To remove this gauge it is necessary to loosen only its outer setting nut 28, and slip its shank 27 out of slot 23. Its inner setting nut 29 and lock nut 30 preserve its setting.

Subsequent workpieces now can be introduced to the chuck for drilling the same pattern of openings. It is not necessary to measure such workpieces even for drilling their first opening A, but instead this position now can be determined by interposing the appropriate spacer blocks 32 between the ends of the thimbles on the gauges and the end and side faces of the workpiece. These spacer blocks would be the first two which previously were used for setting up the device. The positions of workpieces for drilling openings B, C and D are determined as before.

From the foregoing description it is seen that the present invention furnishes a simplified and extremely accurate means and method for positioning workpieces for drilling openings in a predetermined pattern. It is apparent both that other types of workpieces and other patterns of openings are possible, and that the openings could be drilled in other sequences. The invention eliminates the need for measuring any but the first opening in the first workpiece.

While I have shown and described only certain preferred embodiments of the invention, it is apparent that modifications may arise. Therefore, I do not wish to be limited to the disclosure set forth but only by the scope of the appended claims.

I claim:

1. A device for positioning a workpiece for drilling comprising a base plate, means for fixing said base plate to a chuck plate between two of its jaws, a pair of brackets adjustably carried by said base plate and having arms extending outwardly from the edges of said base plate and adapted to extend over the paths of the two jaws between which said base plate is adapted to be fixed, a pair of gauges, one of which is adjustably mounted on each of said bracket arms and adapted to overlie one of these two jaws, said gauges having free inner ends adapted to contact faces of the workpiece, and means for fixing said brackets and said gauges in adjusted position.

2. A device for positioning a workpiece for drilling comprising a base plate, means for fixing said base plate to a chuck plate between two of its jaws, a pair of brackets adjustably carried by said base plate and having arms extending outwardly from the edges of said base plate and adapted to extend over the paths of the two jaws between which said base plate is adapted to be fixed, a pair of gauges each of which includes an elongated screw threaded shank and a pair of setting nuts on said shank, one of said gauge shanks being adjustably carried on each of said bracket arms and adapted to overlie one of these two jaws, and means on the inner ends of said gauge shanks adapted to contact faces of the workpiece, said setting nuts holding said shanks in adjusted position.

3. A device for positioning a workpiece for drilling comprising a base plate, means for fixing said base plate to a chuck plate, a pair of brackets carried by said base plate for adjustment in directions at right angles to each other, a longitudinal gauge and a transverse gauge each having an elongated screw threaded shank and a pair of setting nuts on said shank, one of said gauge shanks being adjustably carried on each of said brackets, and means on the free inner ends of said shanks adapted to engage right-angularly related faces of the workpiece, said setting nuts holding said shanks in adjusted position.

GEORGE W. KAMINSKI.

References Cited in the file of this patent

UNITED STATES PATENTS

| Number | Name | Date |
|---|---|---|
| 1,293,009 | Blaustein | Feb. 4, 1919 |
| 2,209,498 | Wittman | July 30, 1940 |
| 2,309,142 | Stafford | Jan. 26, 1943 |
| 2,341,383 | Johnson | Feb. 8, 1944 |